US010182260B2

(12) United States Patent
Chen et al.

(10) Patent No.: US 10,182,260 B2
(45) Date of Patent: Jan. 15, 2019

(54) SMART DISPLAY AND ASSOCIATED CONTROL METHOD

(71) Applicant: Wistron Corporation, New Taipei (TW)

(72) Inventors: Feng-Yuan Chen, New Taipei (TW); Yew-Peng Kee, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 243 days.

(21) Appl. No.: 14/149,871

(22) Filed: Jan. 8, 2014

(65) Prior Publication Data
US 2015/0040177 A1 Feb. 5, 2015

(30) Foreign Application Priority Data

Aug. 1, 2013 (TW) .............................. 102127656 A

(51) Int. Cl.
*H04N 21/443* (2011.01)
*H04N 21/438* (2011.01)
(Continued)

(52) U.S. Cl.
CPC ............. *H04N 21/443* (2013.01); *G06F 3/14* (2013.01); *G09G 5/003* (2013.01);
(Continued)

(58) Field of Classification Search
CPC ............. H04N 21/2347; H04N 21/438; H04N 21/4104; H04N 21/42202; H04N 21/431;
(Continued)

(56) References Cited

U.S. PATENT DOCUMENTS

2002/0171624 A1* 11/2002 Stecyk ................ H04L 12/2805
345/156
2005/0091311 A1* 4/2005 Lund ................ G08B 13/19656
709/203
(Continued)

FOREIGN PATENT DOCUMENTS

TW 201322219 A1 6/2013

OTHER PUBLICATIONS

TIPO Office Action dated Oct. 27, 2015 in corresponding TW application (No. 102127656).
(Continued)

*Primary Examiner* — Brian T Pendleton
*Assistant Examiner* — Alan H Luong
(74) *Attorney, Agent, or Firm* — McClure, Qualey & Rodack, LLP

(57) ABSTRACT

A smart display and its associated control method are provided. The smart display includes a communication interface, selectively electrically connected to an external host; an internal host, for adjusting an operation mode according to connection status between the communication interface and the external host; a video module, electrically connected to the communication interface and the internal host, for displaying video data from one of the external host and the internal host according to the connection status between the communication interface and the external host; a peripheral; and a switch, electrically connected to the internal host, the communication interface and the peripheral, for controlling the peripheral to execute control data transmitted by one of the external host and the internal host.

18 Claims, 15 Drawing Sheets

(51) Int. Cl.
*H04N 21/41*      (2011.01)
*H04N 21/442*     (2011.01)
*G06F 3/14*       (2006.01)
*G09G 5/00*       (2006.01)

(52) U.S. Cl.
CPC ....... *H04N 21/4104* (2013.01); *H04N 21/438* (2013.01); *H04N 21/44231* (2013.01); *G09G 2330/021* (2013.01); *G09G 2330/026* (2013.01); *G09G 2340/0407* (2013.01); *G09G 2370/045* (2013.01); *G09G 2370/20* (2013.01); *G09G 2370/22* (2013.01)

(58) Field of Classification Search
CPC ........... H04N 21/4312; H04N 21/4316; H04N 21/43615; H04N 21/43635; H04N 21/4367; H04L 12/2805; G06F 1/266; G06F 3/14; G06F 1/1654; G06F 1/3206; G06F 1/3218; G06F 1/3265; G09G 5/003; G09G 5/006; G09G 5/14
USPC ................. 725/131, 117, 151; 345/156–157; 348/705–706, 552, 553, 730; 713/324; 710/313
See application file for complete search history.

(56) References Cited

U.S. PATENT DOCUMENTS

| | | | |
|---|---|---|---|
| 2009/0061841 A1* | 3/2009 | Chaudhri | H04M 1/72527 455/420 |
| 2009/0199253 A1* | 8/2009 | Zhang | H04N 5/4401 725/109 |
| 2012/0019721 A1* | 1/2012 | Choi | H04N 5/4403 348/564 |
| 2012/0084592 A1* | 4/2012 | Lin | G06F 1/266 713/324 |
| 2012/0191894 A1* | 7/2012 | Sasaki | G06F 13/387 710/313 |
| 2013/0125191 A1* | 5/2013 | Chen | G06F 1/1654 725/117 |

OTHER PUBLICATIONS

English translation of TIPO Office Action dated Oct. 27, 2015 in corresponding TW application (No. 102127656).

* cited by examiner

SMART DISPLAY AND ASSOCIATED CONTROL METHOD

This application claims the benefit of Taiwan application Serial No. 102127656, filed Aug. 1, 2013, the subject matter of which is incorporated herein by reference.

BACKGROUND OF THE INVENTION

Field of the Invention

The invention relates in general to a smart display and its associated control method, and more particularly to a smart display and its associated control method used in conjunction with an external host.

Description of the Related Art

FIG. 1 is a schematic diagram illustrating a conventional display system. The display system includes a display 10 and an external host 11. The display 10 further includes a panel 101 and a scaler 103, wherein the scaler 103 is electrically connected to the external host 11 through a video cable.

The display 10 in FIG. 1 operates in a passive manner, and receives video data only from the external host 11. The video data is converted by the scaler 103 and displayed on the panel 101. This display 10 can rapidly display the video data according to the control of the external host 11, but its 11, but its function is quite simple.

Recently, smart displays are available in the markets. In addition to simply utilizing the external host 11 as an image source, the smart display further provides an operation system (hereinafter, OS) and many peripherals. Consequently, the smart display can operate independently without the control of the external host 11.

FIG. 2 is a schematic diagram illustrating a conventional smart display system. Referring to FIG. 2, the smart display system includes a smart display 20 and an external host 21.

Compared with FIG. 1, in addition to the panel 201 and the scaler 203, the smart display 20 further includes an internal host 205 and a peripheral 207. The internal host 205 is electrically connected to the scaler 203 and the peripheral 207, and the peripheral 207 is controlled by the internal host 205 or the external host 21. According to different applications, the scaler 203 can selectively output the video data, provided from the external host 21 or the internal host 205, to the panel 201.

The external host 21 and the internal host 205 operate independently from each other. However, both the panel 201 and the peripheral 207 are shared by the internal host 205 and the external host 21. In real applications, the external host 21 and the internal host 205 may adopt different operation systems, different architectures, and have different uses. Thus, whether the external host 21 and the internal host 205 can smoothly switch the control authority over the panel 201 and the peripheral 207 would affect the performance of the smart display 20.

For example, when a user hopes to switch the smart display 20 from the external control to the internal control, it may happen that the internal host 205 is not able to output the video data to the panel 201 immediately, or the internal host 205 retrieves the control authority over the peripheral 207 after a period of waiting. Such conditions may affect the satisfaction of the user in operating the smart display.

In other words, the control flow of the smart display 20 may be conflict due to the independent operation of the external host 21 and the internal host 205.

SUMMARY OF THE INVENTION

According to a first aspect of the present invention, a smart display used in conjunction with an external host is provided. The smart display includes a communication interface, an internal host, a video module, at least one peripheral and a switch. The communication interface is selectively electrically connected to the external host. The internal host adjusts an operation mode according to connection status between the communication interface and the external host. The video module, electrically connected to the communication interface and the internal host, displays video data transmitted by one of the external host and the internal host according to the connection status between the communication interface and the external host. The switch, electrically connected to the internal host, the communication interface and the at least one peripheral, controls the at least one peripheral to execute control data transmitted by one of the external host and the internal host.

According to a second aspect of the present invention, a control method is provided. The control method is applied between an external host and a smart display including a communication interface, an internal host, a video module, at least one peripheral and a switch. The control method includes the steps of: adjusting, by the internal host, an operation mode according to connection status between the communication interface and the external host, wherein the communication interface is selectively electrically connected to the external host; displaying, by the video module, video data transmitted by one of the external host and the internal host according to the connection status between the communication interface and the external host; and controlling, by the switch, the at least one peripheral to execute control data transmitted by the external host and the internal host.

The above and other aspects of the invention will become better understood with regard to the following detailed description of the preferred but non-limiting embodiments. The following description is made with reference to the accompanying drawings.

DETAILED DESCRIPTION OF THE INVENTION

In an embodiment of the invention, a communication interface is provided in a smart display. The communication interface is selectively connected to an external host through a common cable.

Figure 1:
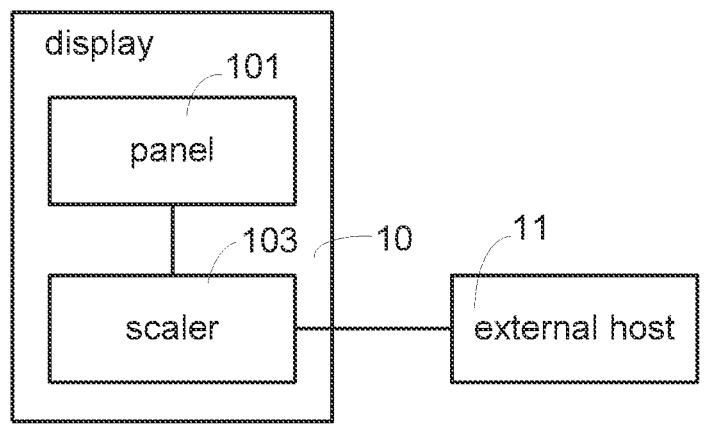
FIG. 1 (prior art) is a schematic diagram showing a conventional display system.
Figure 2:
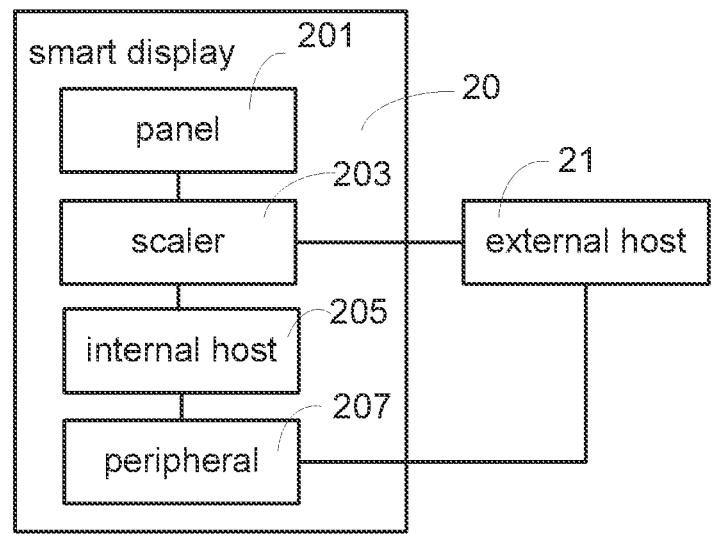
FIG. 2 (prior art) is a schematic diagram showing a conventional smart display system.
Figure 3:
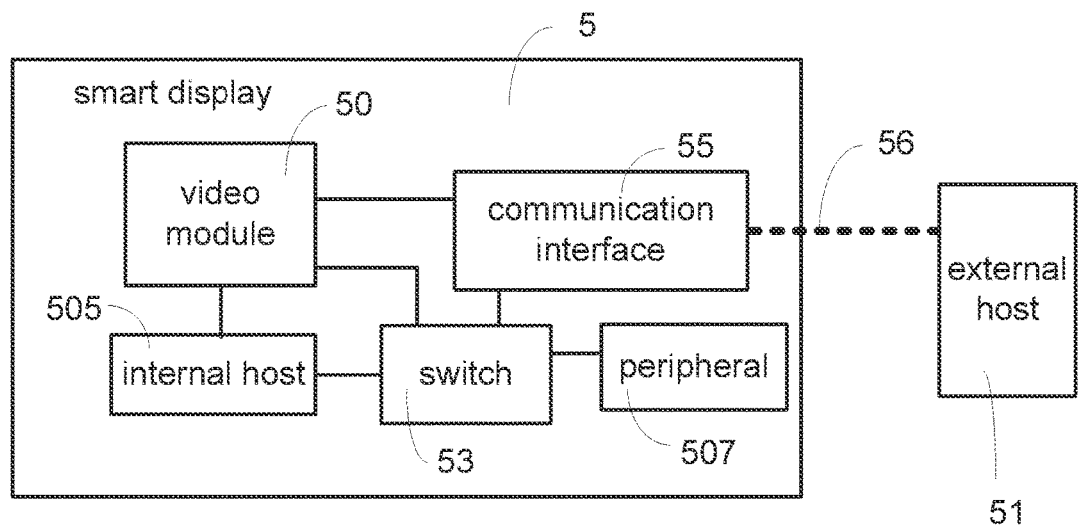
FIG. 3 is a schematic diagram showing a smart display, connected to an external host through a communication interface, according to the invention.

FIG. 3 is a schematic diagram showing connection status between a smart display 5 and an external host 51 through a communication interface 55. The smart display system includes the external host 51 and the smart display 5. The dashed line in the drawing represents a common cable 56 between the external host 51 and the smart display 5. The common cable 56 can selectively electrically connect the external host 51 to the communication interface 55 of the smart display 5 according to the user's operation.

Figure 7:
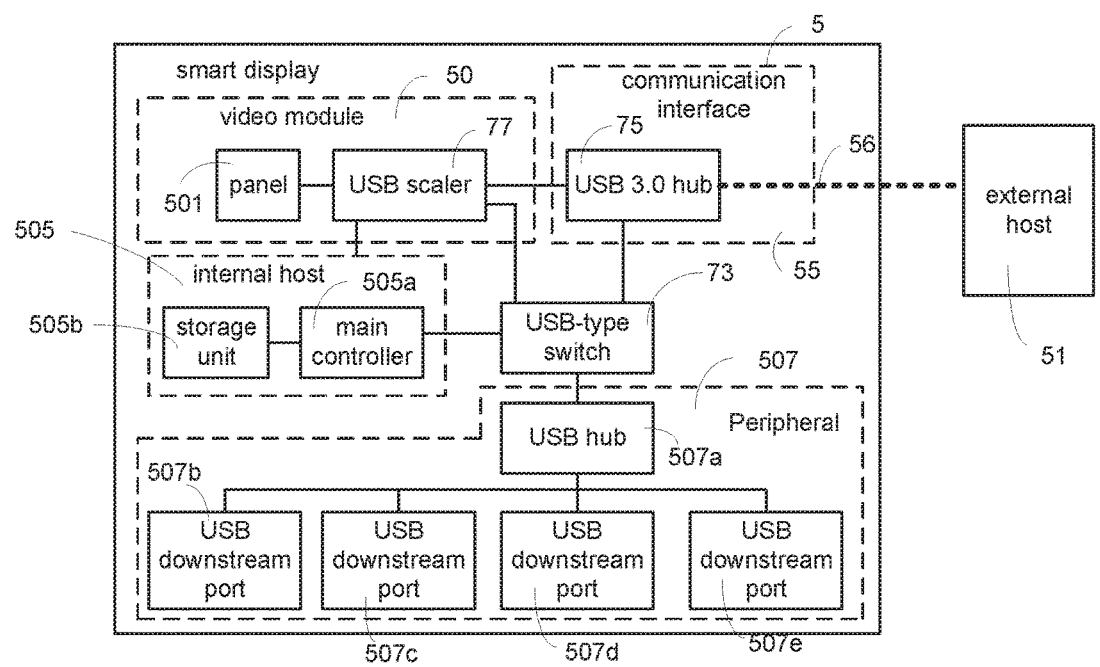
FIG. 7 is a schematic diagram showing the smart display of FIG. 3, which is assumed to have a peripheral including a USB hub and multiple USB downstream ports.

Referring to FIGS. 3 and 7, the smart display 5 includes a video module 50 (including a panel 501 and a USB scaler 77), an internal host 505, a switch 53, a peripheral 507 and the communication interface 55. The internal host 505 includes a main controller 505a (not shown) and a storage unit 505b (not shown). Furthermore, the switch 53 is electrically connected between the video module 50 and the internal host 505, and between the communication interface 55 and the peripheral 507. Functions of the switch 53 will be described later.

Generally speaking, the external host 51 may be a personal computer using Microsoft's operation system. In addition, the internal host 505 may use embedded operation systems, such as Linux, Android and the like. Of course, the operation systems of the external host 51 and the internal host 505 may also be changed without any limitative purpose.

According to the user's requirement, the video module 50 and the peripheral 507 in the smart display 5 can be controlled by the external host 51 or the internal host 505. The operation systems of the external host 51 and the internal host 505 are independent from each other, and their control on the video module 50 and the peripheral 507 are not necessary to be consistent.

When the user wishes to utilize the smart display 5 to display the video data of the external host 51, the smart display 5 simply provides the video display function. At this time, the smart display 5 operates as a conventional display, and receives the video data from the external host 51 through the communication interface 55. Afterwards, the video module 50 plays the video data.

Alternatively, the user may also select to use the smart display 5 independently. That is, the user operates the smart display 5 without using the external host 51. At this time, the video module 50 displays the video data provided by the internal host 505.

Furthermore, the user may also select the external host 51 or the internal host 505 to control the peripheral 507. When the external host 51 controls the peripheral 507, the external host 51 transmits the control data required by the peripheral 507 through the common cable 56. Via the common cable 56 and the communication interface 55, the control data is transmitted to the switch 53. In addition, the control data is further transmitted to the peripheral 507 through the switch 53. On the other hand, when the internal host 505 controls the peripheral 507, the internal host 505 is the one transmits the control data, required by the peripheral 507, to the peripheral 507 through the switch 53.

It is to be noted that upon the practical application, the peripheral 507 provided to the external host 51 may be embedded in the smart display 5 (e.g. a camera or a wireless network module etc.). When the smart display 5 is electrically connected to the external host 51, the external host 51 may use the function of the camera or the wireless network module.

Alternatively, the peripheral 507 may be externally connected or plugged to the smart display 5. The peripheral 507 provided in the externally connected manner includes, for example, a mobile disk, a mouse, a keyboard and the like connected to the universal serial bus (USB) socket and so forth. In addition, the peripheral 507 may be different types of memory cards accessible by the smart display 5 as well.

Figure 4:
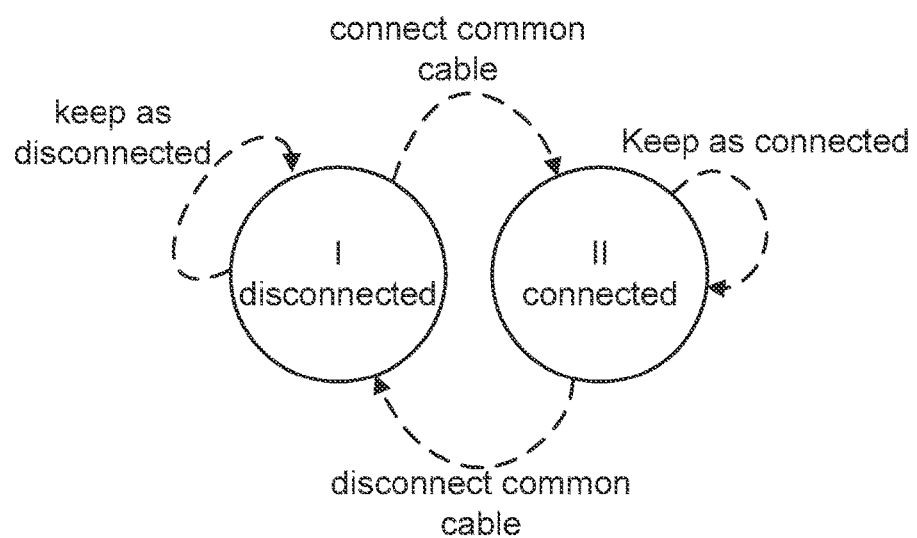
FIG. 4 is a schematic diagram showing connection of the smart display of FIG. 3.

FIG. 4 is a schematic diagram showing connection of the smart display of FIG. 3. As shown in FIGS. 4 and 3, the smart display 5 may be electrically connected to the external host 51 through the common cable 56 disposed in between. Alternatively, when the common cable 56 is disconnected, the smart display 5 and the external host 51 will operate independently.

In FIG. 4, two circles represent two types of connection status between the smart display 5 and the external host 51. The left-side circle represents when no connection is established between the smart display 5 and the external host 51. The left-side circle is referred to as a first connection status I. The right-side circle represents the when the smart display 5 and the external host 51 are electrically connected to each other through the common cable 56. The right-side circle is referred to as a second connection status II. Furthermore, the dashed lines in the drawing represent transitions of the connection statuses between the smart display 5 and the external host 51.

First, when the smart display 5 and the external host 51 stays as disconnected, the connection status of the smart display 5 will correspond to the left-side circle (i.e. the first connection status I). In the first connection status I, the video module 50 displays the video data of the internal host 505. Meanwhile, the peripheral 507 is set as being controlled by the internal host 505 only.

Next, when the smart display 5 and the external host 51 are connected, the connection status of the smart display 5 remains as the right-side circle (i.e. the second connection status II). In the second connection status II, the video module 50 displays the video data of the external host 51. Meanwhile, the peripheral 507 is set as being controlled by the external host 51 only.

When the connection status between the smart display 5 and the external host 51 switches from disconnected to connected, the connection status of the smart display 5 switches from the left-side circle (i.e., the first connection status I) to the right-side circle (i.e., the second connection status II). At this time, the internal host 505 of the smart display 5 is shut down, and the connection status of the peripheral 507 is reset. That is, control authority over the peripheral 507 is switched from the original internal host 505 to the external host 51.

On the contrary, if the connection status between the smart display 5 and the external host 51 switches from connected to disconnected, the connection status of the smart display 5 switches from the right-side circle (i.e., the second connection status II) to the left-side circle (i.e., the first connection status I). At this time, the internal host 505 is waken up and initialized. In addition, control authority over the peripheral 507 will switched from the external host 51 to the internal host 505.

It is to be noted that the smart display 5 stores a setting parameter that may be selected according to a user's preference. If the smart display 5 is not connected to the external host 51, the peripheral 507 is kept as being controlled by the internal host 505, and is not affected due to the change of the setting parameter. On the other hand, if the smart display 5 is connected to the external host 51, the control authority of the external host 51 on the peripheral 507 is affected by the setting of the setting parameter.

Figure 5:
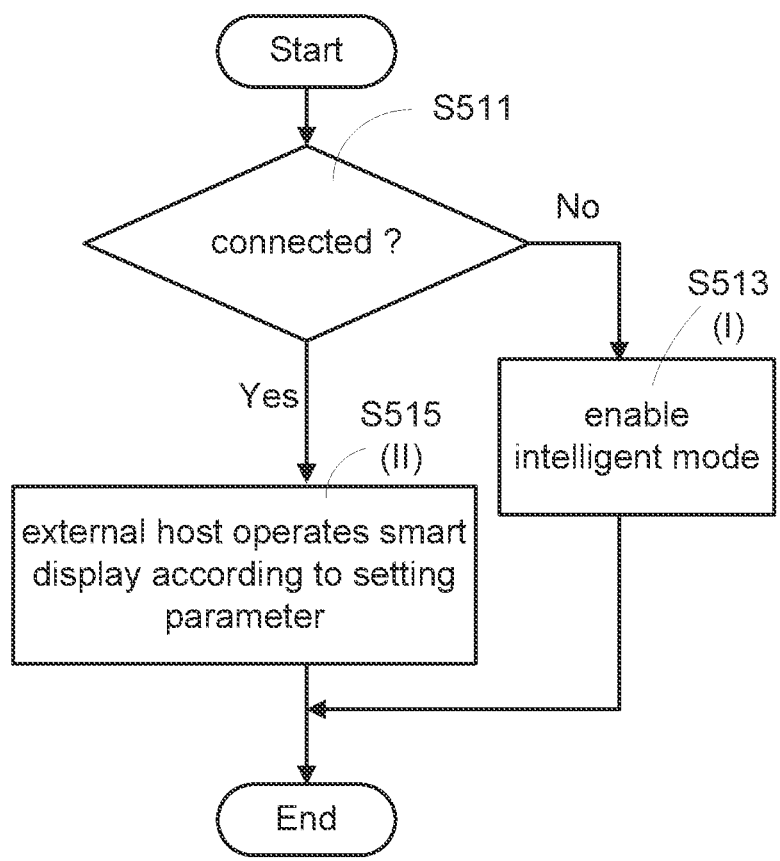
FIG. 5 is a flow chart showing the smart display of FIG. 3 operating according to the connection.

The setting parameter corresponds to two settings, an automatic detection setting and an internal-use-only setting. First, if the setting parameter corresponds to the automatic detection setting, the host controlling the peripheral 507 may vary. Second, if the setting parameter corresponds to the internal-use-only setting, the peripheral 507 is always controlled by the internal host 505. According to the user's setting on the setting parameter, the switch 53 determines whether to let the external host 51 control the peripheral 507 or not. FIG. 5 is a flow chart showing the smart display of FIG. 3 operating according to the connection status.

First, it is judged whether the smart display 5 and the external host 51 are connected (step S511). If the judgment result of the step S511 is negative, it represents that the smart display 5 enters an intelligent mode (step S513). In the intelligent mode, the smart display itself owns control authority. In other words, the internal host 505 controls the video module 50 and the peripheral 507. The step S513 corresponds to the first connection status I shown in FIG. 4.

If the judgment result of the step S511 is affirmative, the smart display 5 is connected to the external host 51. Consequently, the smart display 5 enters a conventional mode. In the conventional mode, the smart display 5 is passively controlled by the external host 51. When the smart display 5 is in the conventional mode, the external host 51 determines how to control the smart display 5 according to the change of the setting parameter (step S515). The step S515 corresponds to the second connection status II shown in FIG. 5.

As mentioned above, the setting parameter may be set as the automatic detection setting or the internal-use-only setting.

When the setting parameter is set as the automatic detection, the smart display 5 may selectively judge which of the external and the internal hosts owns the control authority over the peripheral 507. The judgment is made by referring the connection status between the smart display 5 and the external host 51. In such case, the step S515 implies that the external host 51 may control the peripheral 507 of the smart display 5 and output the video data to be played to the smart display 5.

Alternatively, when the setting parameter is set as the internal-use-only, only the internal host 505 can control the peripheral 507. In other words, the external host 51 cannot control the peripheral 507 when the setting parameter is set as internal-use-only. When the setting parameter adopts this setting, the step S515 implies that the external host 51 cannot control the peripheral 507 of the smart display 5, but only outputs the video data to the smart display 5. It is to be noted that the setting parameter only affects the control authority over the peripheral 507, not the video module 50.

According to the idea of the invention, the smart display 5 can provide a software setting flow so that the user selects the setting parameter according to personal preference. For example, after the user presses a setting button, the software setting flow may start so that the user sets whether to enable the intelligent mode of the smart display 5 or to modify the setting parameter, or the like according to the personal use habit. The software setting flow may be displayed through the on-screen-display (hereinafter, OSD) for the user to execute the setting. The detailed steps may be freely used by one of ordinary skilled in the art, and will not be described herein.

The detailed flow charts for the switching of connection statuses in FIGS. 4 and 5 will be described with reference to FIGS. 6A and 6B. First, the smart display 5 is powered on (step S801), and the video module 50 is initialized (step S803). Next, it is judged whether the common cable 56 is connected between the smart display 5 and the external host 51 through (step S805). The step S805 corresponds to the step S511 of FIG. 5.

If the judgment result of the step S805 is affirmative, it represents that the user wishes to utilize the smart display 5 to display the video data of the external host 51. That is, the smart display 5 should enter the passively controlled conventional mode. At this time, the video module 50 is used to display the video data of the external host 51 (step S807). In addition, the peripheral 507 is set as to be controlled by the external host 51 (step S809).

As mentioned hereinabove, the steps S807 and S809 represent that the smart display 5 is in the passively controlled conventional mode. Thus, the steps S807 and S809 correspond to the second connection status II of FIG. 4 and the step S515 of FIG. 5.

Next, it is again judged whether the connection status between the smart display 5 and the external host 51 changes (step S811). If the judgment result of the step S811 is affirmative, it represents that the smart display 5 and the external host 51 remains as connected. This judgment result is equivalent to the dashed line arrow with the starting and the ending located at the second connection status II in FIG. 4. At this time, the video module 50 keeps displaying the video data of the external host 51 (step S815).

On the contrary, if the judgment result of the step S811 is negative, it represents that connection status between the smart display 5 and the external host 51 changes from connected to disconnected. At this time, the smart display 5 should switch from the second connection status II of FIG. 4 to the first connection status I. The video module 50 would enable the internal host 505 so that the internal host switches from a turn-off mode to a working mode (step S813). Therefore, the step S813 is equivalent to the lower dashed line arrow in FIG. 4.

Thereafter, after the internal host 505 is initialized (step S817) and the peripheral 507 is set as for the internal use (step S819), the internal host 505 provides the video data to the video module 50 for display (step S821).

As mentioned hereinabove, the steps S817, S819 and S821 represent that the smart display 5 is in the intelligent mode and the internal host actively controls the operation of the smart display 5. Thus, the step S817, S819 and S821 correspond to the first connection status I (disconnected) of FIG. 4 and the step S513 of FIG. 5.

If the judgment result of the step S805 is negative, it represents that the user wishes to make the smart display 5 enter the intelligent mode for active control. Therefore, the internal host 505 will be initialized (step S817), and the peripheral 507 is set as for the internal use (step S819).

Thereafter, the display of the internal video data is started to be controlled by the internal host 505 (step S821). In addition, it is judged whether the connection status between the smart display 5 and the external host 51 changes (step S823).

As mentioned hereinabove, the step S823 judges whether the smart display 5 should switch from the actively controlled intelligent mode to the passively controlled conventional mode. Thus, the step S823 corresponds to the judgment process of being kept in the first connection status I in FIG. 4, or switching from the first connection status I (disconnected) to the second connection status II.

If the judgment result of the step S823 is negative, it represents that the common cable 56 is still not connected between the external host 51 and the smart display 5. This judgment result is equivalent to the dashed line arrow with the starting and the ending in the first connection status I in FIG. 4. At this time, the smart display 5 is kept as being controlled by the internal host 505, and the internal host 505 can control the video module 50 to display the previously stored video data (step S821).

If the judgment result of the step S823 is affirmative, it represents that the user wishes to use the external host 51 to control the smart display 5. That is, the smart display 5 switches from the actively controlled intelligent mode to the passively controlled conventional mode. After the internal host 505 and the peripheral 507 are shut down (step S825), the video module 50 starts to display the external video data (step S827).

If the setting parameter is set as the automatic detection, the smart display 5 can make the user use the function of the peripheral 507 while operating the external host 51. At this time, the smart display 5 needs to re-enable the peripheral 507, which was previously shut down in the step S825. That is, the peripheral 507 in the turn-off mode again enters the working mode. In addition, the peripheral 507 is set as being used by the external host 51.

Generally speaking, the mode switching of the peripheral 507 requires the relatively long time. Thus, when the peripheral 507 switches the executing mode, the video module 50 can output a prompt message through the OSD (step S829). The prompt message notifies the user not to use the peripheral 507 during initialization of the peripheral 507. The switch 53 will enable the peripheral 507, which is originally in the shutdown mode. In addition, the peripheral 507 is set as being used by the external host 51 (step S831). After the peripheral 507 finishes the enabling flow and setting, the video module 50 will hide the prompt message (step S833).

As mentioned hereinabove, the steps S825, S827, S829, S831 and S833 represent the process, in which the smart display 5 switches from the actively controlled intelligent mode to the passively controlled conventional mode. Thus, the steps S825, S827, S829, S831 and S833 correspond to the process, in which the smart display 5 switches from the first connection status I to the second connection status II (the upper dashed line arrow in FIG. 4) due to the disconnection.

Then, the video module 50 keeps displaying the video data of the external host 51 (step S807), and additionally provides the peripheral 507 to be operated by the external host 51 (step S809).

Figure 6A:
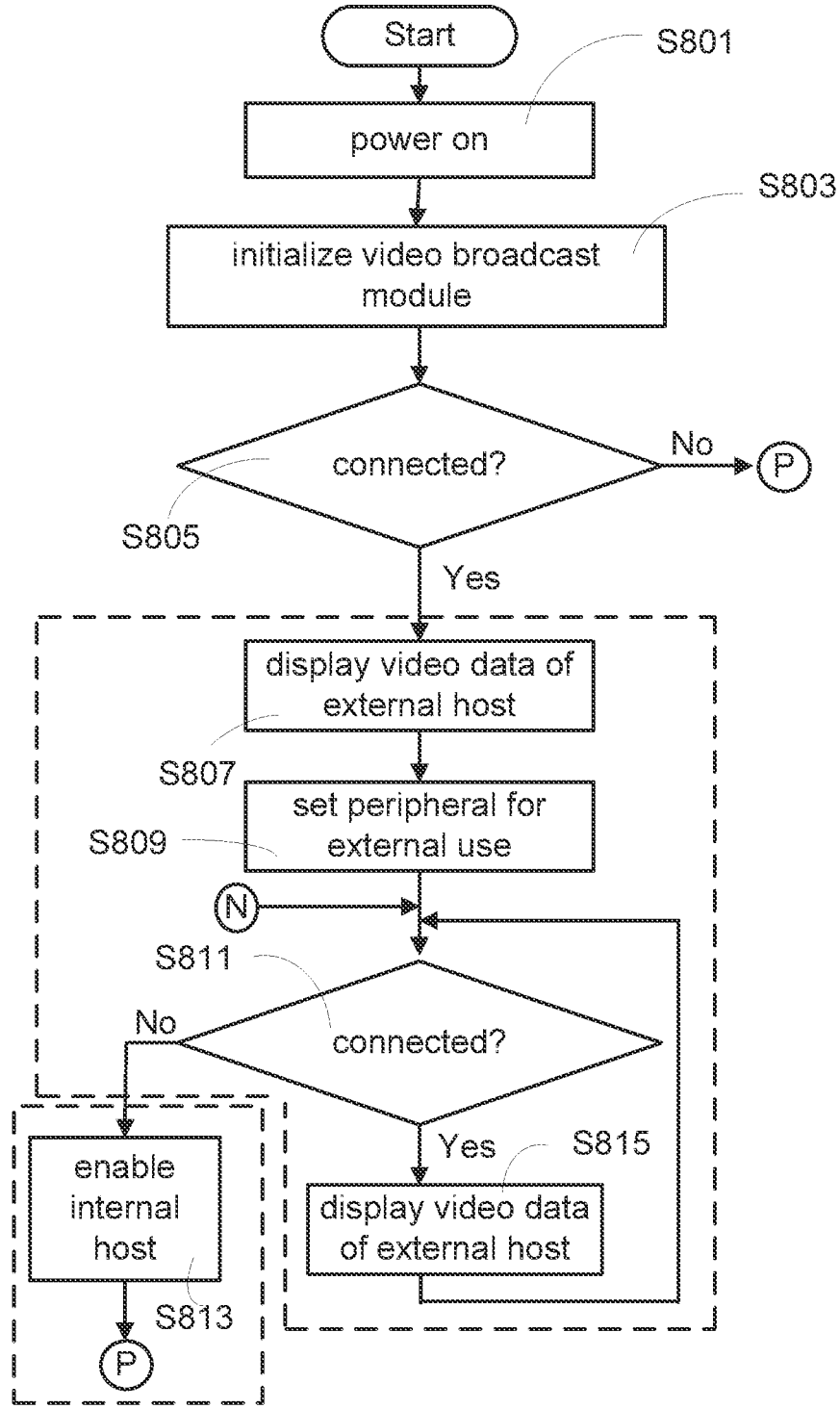
FIGS. 6A and 6B are detailed flow charts further showing the smart display of FIG. 3 changing its operation mode according to the connection with the external host.
Figure 6B:
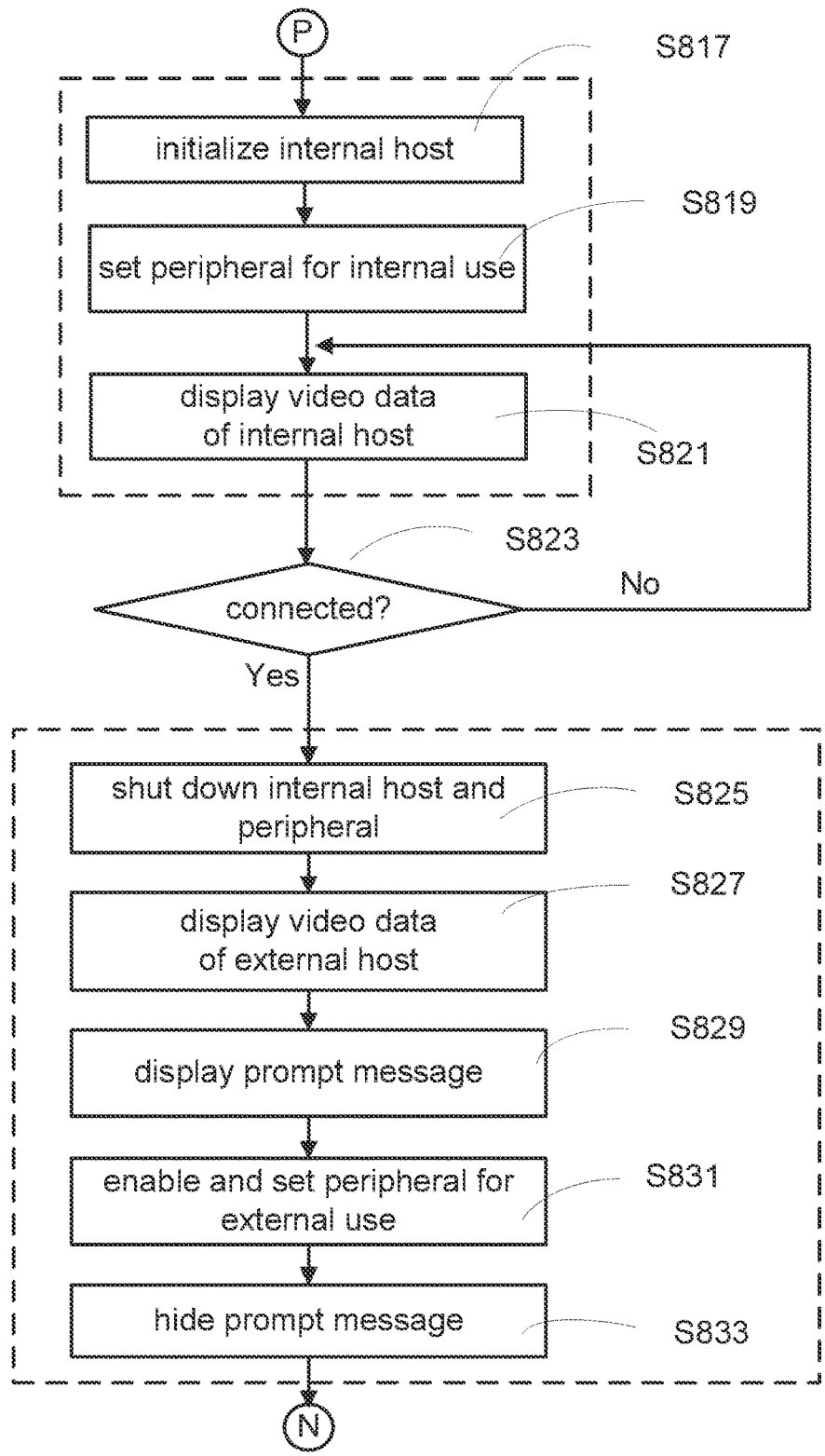

It is to be noted that the flows of FIGS. 6A and 6B assume the setting parameter is set as the automatic detection. On the other hand, if the setting parameter is set as for internal-use-only, the steps S809, S819, S829, S831 and S833 may be omitted.

Next, illustrations will be made based on the architecture of FIG. 4 and with the assumption that the peripheral 507 includes a USB hub and multiple USB downstream ports.

FIG. 7 is a schematic diagram showing the smart display 5 of FIG. 3, which is assumed to have a peripheral including a USB hub 507*a* and multiple USB downstream ports 507*b* to 507*e*.

FIG. 7 further illustrates that the internal host 505 includes a main controller 505*a* and a storage unit 505*b*. The main controller 505*a* and the storage unit 505*b* are electrically connected to each other. The video module 50 includes a USB scaler 77 and a panel 501 which are electrically connected to each other. The storage unit 505*b* may be a volatile or non-volatile memory device. When the internal host 505 controls the video module 50 to display, the storage unit 505*b* can correspondingly provide the video data to the internal host 505.

The external host 51 transmits common data, mixed with the video data and the control data, to a USB 3.0 hub 75 through the common cable 56. In this embodiment, the common cable 56 is a USB cable. It should be noted that the common cable 56 is not limited to the USB cable. Next, the USB 3.0 hub 75 further transmits the common data to the USB scaler 77, and the USB scaler 77 separates the video data and the control data.

A USB-type switch 73 is electrically connected to a USB hub 507*a*, and the USB hub 507*a* is electrically connected to a plurality of USB downstream ports 507*b*, 507*c*, 507*d* and 507*e*. Thus, if the user connects/plugs the USB device to the USB downstream ports 507*b*, 507*c*, 507*d* and 507*e*, the USB device can be used by the external host 51 or the internal host 505.

Figure 8:
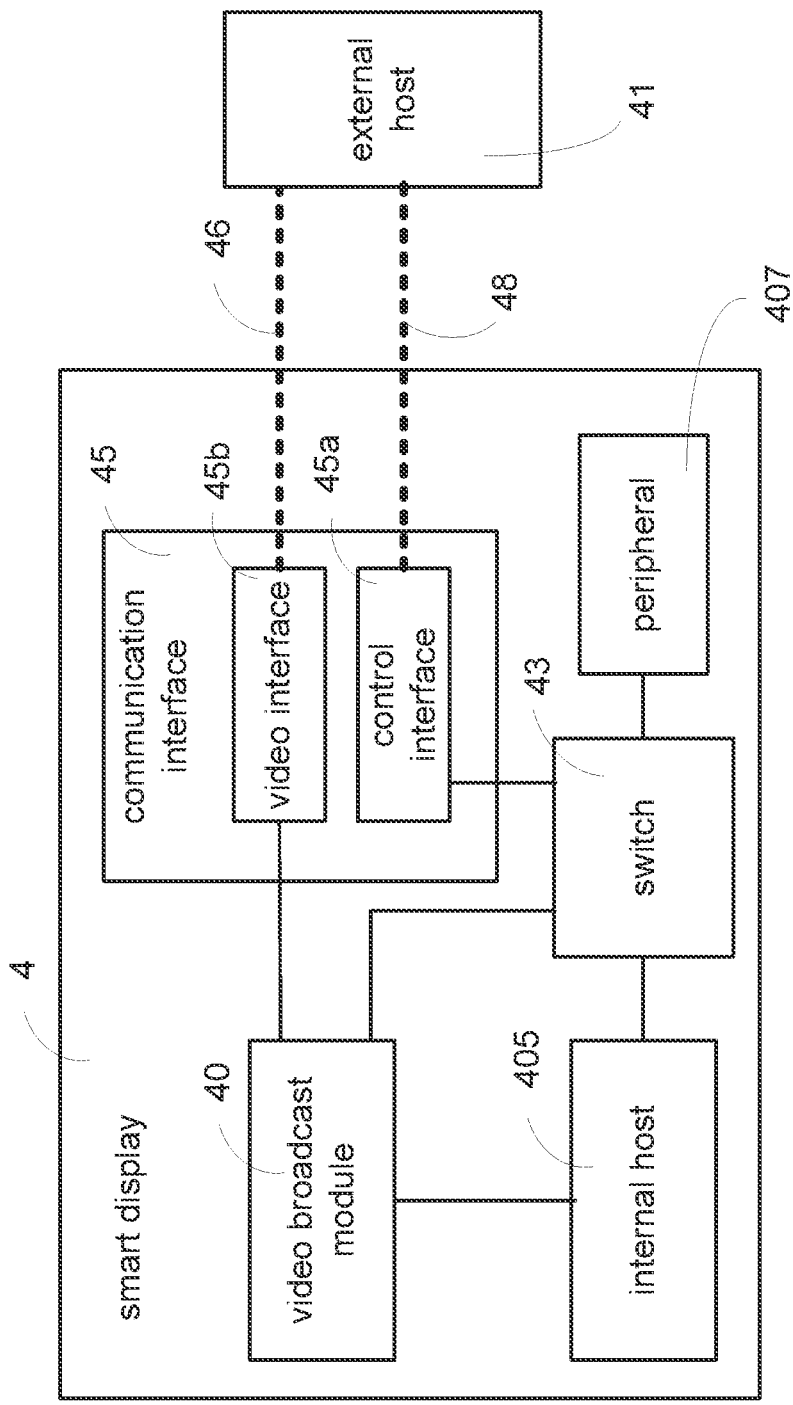
FIG. 8 is a schematic diagram showing the smart display, connected connected to the external host through an independent video interface and a control interface, according to the invention.

In another embodiment of the invention, an independent video interface 45*b* and a control interface 45*a* are provided in a smart display 4, which is selectively connected to an external host 41 in conjunction with a video cable and a control cable. FIG. 8 is a schematic diagram showing the smart display 4, connected to the external host 41 through an independent video interface 45*b* and a control interface 45*a*, according to the present invention.

The smart display 4 includes a video module 40, an internal host 405, a switch 43, a peripheral 407 and a communication interface 45. The communication interface 45 further includes the control interface 45*a* and the video interface 45*b*.

The external host 41 is electrically connected to the video interface 45*b* through a video cable 46. Through the video cable 46, the video interface 45*b* receives the video data provided from the external host 41, and further transmits the video data to the video module 40.

The external host 41 is electrically connected to the control interface 45*a* through a control cable 48. Through the control cable 48, the control interface 45*a* further transmits the control data, provided from the external host 41, to the switch 43. Thereafter, the control data is transmitted to the peripheral 407 through the switch 43.

Figure 9:
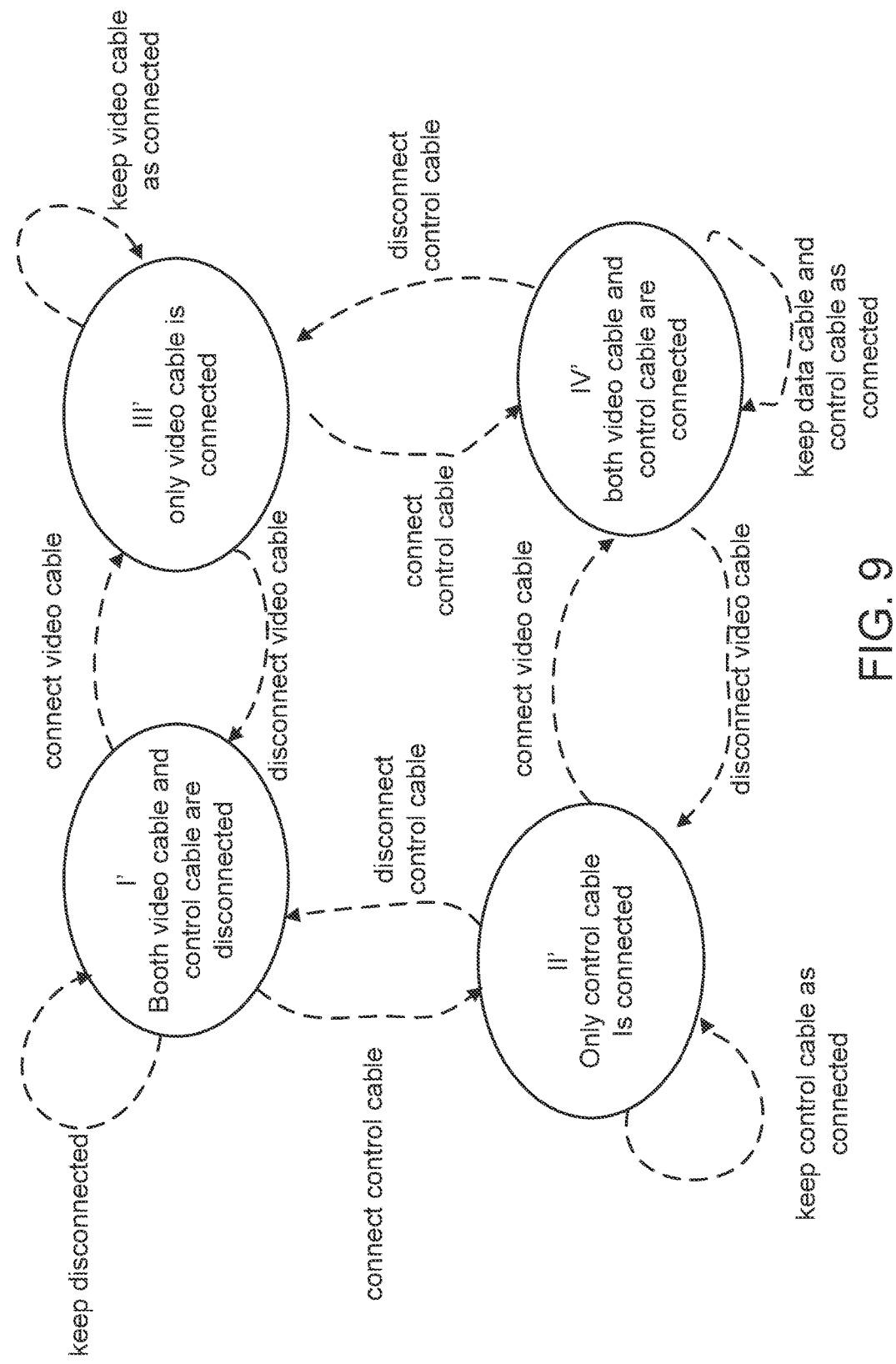
FIG. 9 is a schematic diagram showing connection of the smart display of FIG. 8.

FIG. 9 is a schematic diagram showing connection of the smart display 4 of FIG. 8. Four circles in this drawing represent four types of connection status between the smart display 4 and the external host 41. The dashed line in the drawing represents the transition of connection statuses between the smart display 4 and the external host 41.

The circle at the upper left corner of FIG. 9 represents a first connection status I', in which no connection is established between the smart display 4 and the external host 41. In this connection status, the video module 40 displays the video data of the internal host 405. On the other hand, the peripheral 407 is also set as being controlled by the internal host 405.

The circle at the lower left corner of FIG. 9 represents a second connection status II', in which the smart display 4 is connected to the external host 41 through the control cable 48 only. The video module 40 will display the video data of the internal host 405. On the other hand, the peripheral 407 is also set as being controlled by the internal host 405.

The circle at the upper right corner of FIG. 9 represents a third connection status III', in which the smart display 4 is connected to the external host 41 through the video cable 46 only. In this connection status, the video module 40 will display the video data of the external host 41. On the other hand, the internal host 405 and the peripheral 407 will be set as entering the standby mode.

The circle at the lower right corner of FIG. 9 represents a fourth connection status IV', in which the smart display 4 is electrically connected to the external host 41 through the video cable 46 and the control cable 48 concurrently. In this connection status, the video module 40 will display the video data of the external host 41. On the other hand, according to different settings of the setting parameters, the peripheral 407 may be set as being controlled by the external host 41. Alternatively, the user is informed by a prompt message indicating that the peripheral 407 cannot be currently controlled by the external host 41.

It is to be noted that every connection status of FIG. 9 may be correspondingly changed to two adjacent connection statuses or kept at the original connection status according to the connection of the video cable 46 and/or the control cable 48.

However, regardless the original connection status, the smart display 4 will preferentially judge whether the video cable 46 is connected. If the video cable 46 is not connected between the smart display 4 and the external host, it is unnecessary to judge the connection of the control cable 48. Only when the external host 41 is indeed connected to the smart display 4 through the video cable 46, the smart display 4 further judges the connection of the control cable 48.

Taking the third connection status III' as an example, it is first judged whether the video cable 46 is kept connected. If yes, it represents that the smart display 4 cannot change to the first connection status I'. Next, it is further judged whether the smart display 4 should keep in the third connection status III', or switch from the third connection status III' to the fourth connection status IV' according to whether the control cable 48 is connected in between the smart display 4 and the external host 41.

Figure 10:
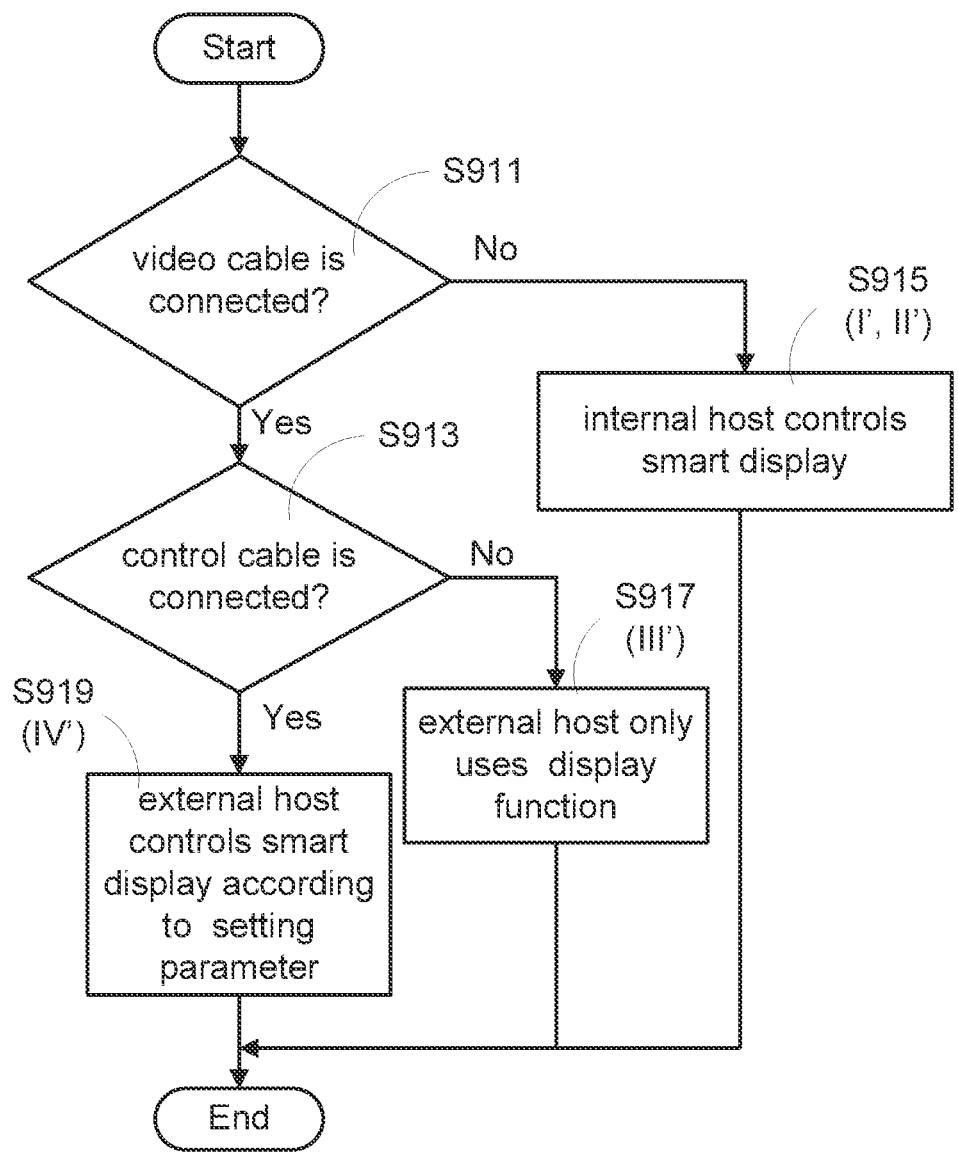
FIG. 10 is a flow chart showing the smart display of FIG. 8, which operates according to the connection status between the smart display and the external host.

FIG. 10 is a flow chart showing the smart display 4 of FIG. 8 operating according to the connection status between the smart display 4 and the external host 41. In FIG. 10, the connection statuses corresponding to steps are notified. First, it is judged whether the video cable 46 is connected between the smart display 4 and the external host 41 (step S911). If the judgment result of the step S911 is negative, the intelligent mode of the smart display 4 is enabled and the internal host 405 starts to control the smart display 4 (step S915). At this time, the video module 40 displays the video data provided from the internal host 405. In addition, the peripheral 407 is set as for the internal use. Referring to the connection status diagram of FIG. 9, the step S915 is equivalent to the first connection status I' and the second connection status II'.

If the judgment result of the step S911 is affirmative, it is further judged whether the smart display 4 is connected to the external host 41 through the control cable 48 (step S913).

If the judgment result of the step S913 is negative, it represents that the external host 41 uses only the display function of the smart display 4 (step S917). That is, the user uses the smart display 4 as the conventional display. Referring to the connection status diagram of FIG. 9, the step S917 is equivalent to the third connection status III'.

If the judgment result of the step S913 is affirmative, it represents that the user further wishes to let the external host 41 use the peripheral 407 of the smart display 4 (step S919). Referring to the connection status diagram of FIG. 9, the step S919 is equivalent to the fourth connection status IV'.

Furthermore, how the smart display 4 executes the control flow when the setting parameter is set as the automatic detection will be described with reference to FIGS. 11A to 11C. Also, how the smart display 4 executes the control flow according to switching of the connection statues when the setting parameter is set as internal-use-only will be described with reference to FIGS. 12A and 12B.

Figure 11A:
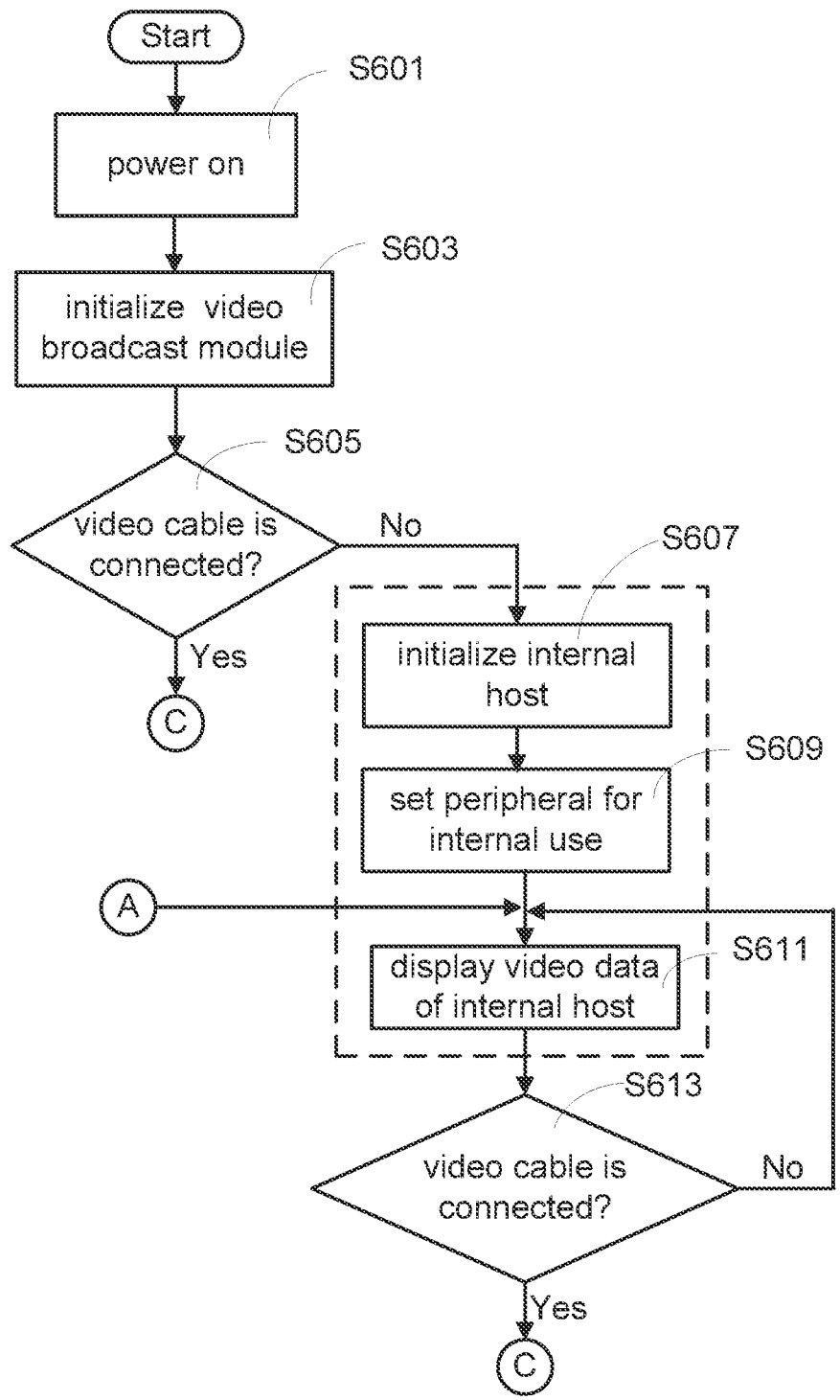
FIGS. 11A to 11C are flow charts showing the smart display of FIG. 8, which determines to control a main part of the peripheral according to an automatic detection result.
Figure 11B:
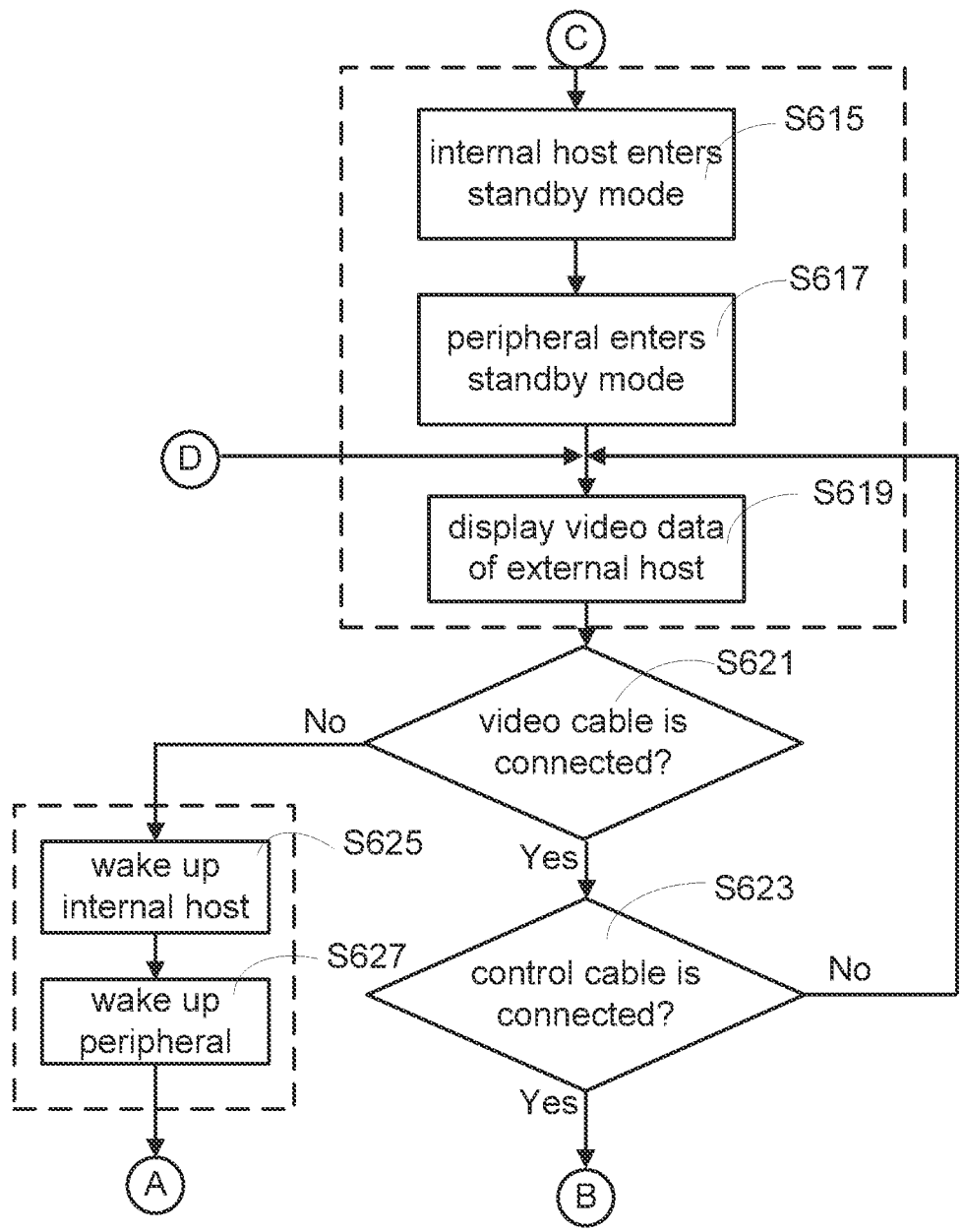
Figure 11C:
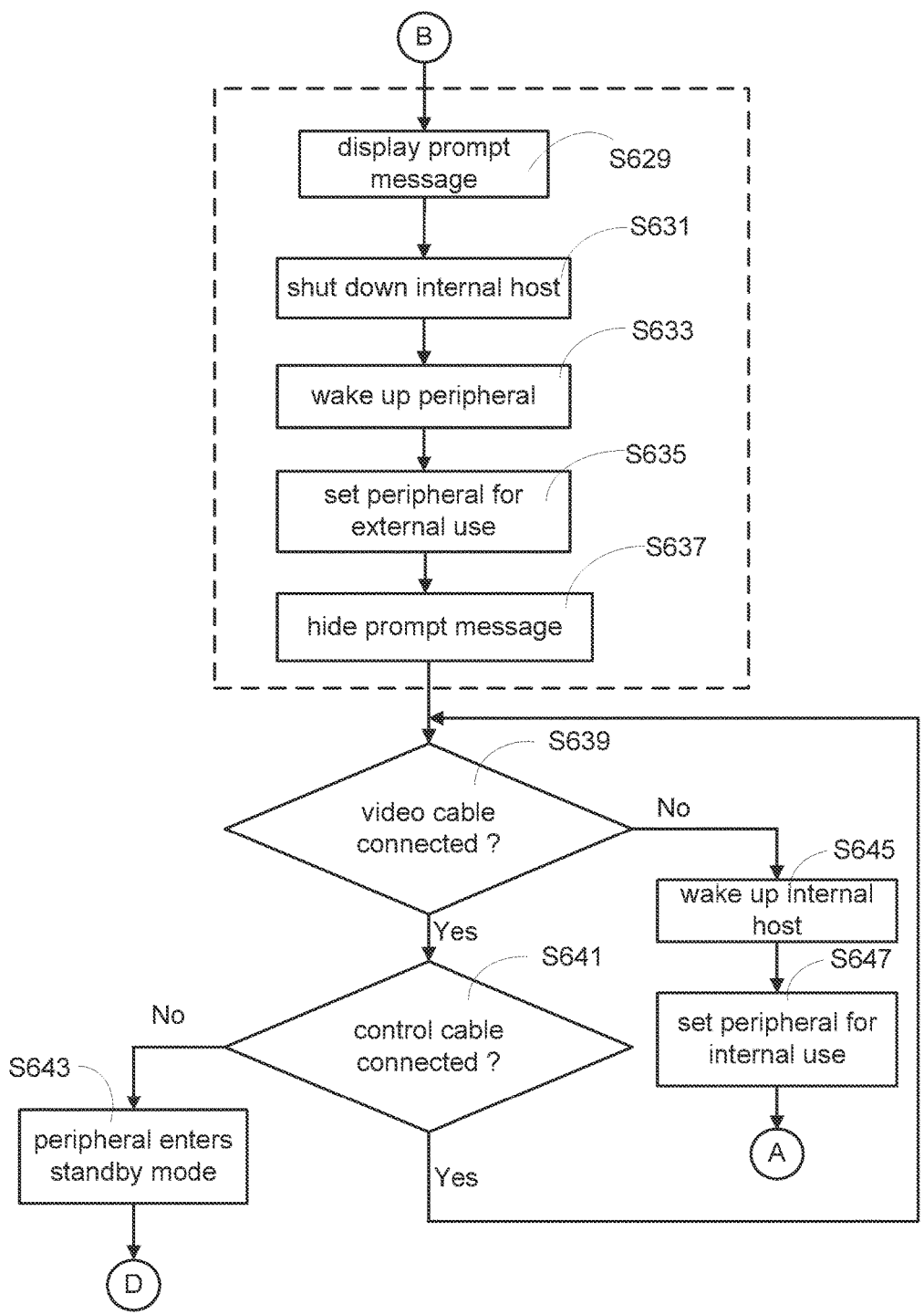

FIGS. 11A to 11C are flow charts showing the smart display 4 of FIG. 8, which determines control authority over the peripheral 407 according to an automatic detection result. In FIGS. 11A to 11C, the flows also correspond to switching of the connection statuses and flows of FIGS. 9 and 10.

First, the smart display 4 is powered on (step S601), and the video module 40 is initialized (step S603). Next, it is judged whether the video cable 46 is connected between the smart display 4 and the external host 41 through (step S605). The step S605 corresponds to the step S911 of FIG. 10.

If the judgment result of the step S605 is affirmative, it represents that the user wishes to use the smart display 4 to display the video data of the external host 41. At this time, the steps S615, S617 and S619 will be executed.

On the other hand, if the judgment result of the step S605 is negative, it represents that the user wishes to operate the smart display 4 in the actively controlled intelligent mode. As mentioned above, when the video cable 46 is asserted as disconnected, it is unnecessary to judge the connection of the control cable 48. Thus, the smart display 4 will initialize the internal host 405 (step S607), and additionally set the peripheral 407 as for the internal use (step S609). Thereafter, the video module 40 displays the video data of the internal host 405 (step S611).

As mentioned above, the steps S607, S609 and S611 represent that the smart display 4 is in the actively controlled intelligent mode. Thus, the steps S607, S609 and S611 correspond to the first connection status I' and the second connection status II' of FIG. 9 and the step S915 of FIG. 10.

Thereafter, in the process of displaying the internal video data, the smart display 4 again judges whether the video cable 46 is disposed between the smart display 4 and the external host 41 (step S613). If the smart display 4 is originally in the first connection status I' of FIG. 9, then the step S613 corresponds to the judgment of whether to switch the smart display 4 from the first connection status I' to the third connection status III', or to keep the smart display 4 in the first connection status I'. If the smart display 4 is originally in the second connection status II' of FIG. 9, then the step S613 corresponds to corresponds to the judgment of whether to switch the smart display 4 from the second connection status II' to the fourth connection status IV', or to keep the smart display 4 in the second connection status II'.

If the judgment result of the step S613 is negative, it represents that the user still wishes to keep the smart display 4 in the actively controlled intelligent mode. Thus, the smart display 4 continuously displays the video data of the internal host (step S611). This condition is equivalent to the condition of FIG. 9 of keeping in the first connection status I' or the condition of keeping in the second connection status II'.

If the judgment result of the step S613 is affirmative, it represents that user has changed his/her mind and wishes to control the smart display 4 through the external host 41. This condition is equivalent to switch the smart display 4 from the first connection status I' to the third connection status III' or to switch the smart display 4 from the second connection status II' to the fourth connection status IV' in FIG. 9.

At this time, the smart display 4 prepares to switch from the actively controlled intelligent mode to the passively controlled conventional mode. First, the video module 40 sets the internal host 405 to enter an operation mode with the lower power consumption, such as a sleep mode, a standby mode or the like (step S615). In addition, the switch 43 will also control the peripheral 407 to enter the sleep mode, the standby mode or the like (step S617). Thereafter, the video module 40 will display the video data of the external host 41 (step S619).

As mentioned above, the steps S615, S617 and S619 represent that the smart display 4 is in the passively controlled conventional mode. Thus, the steps S607, S609 and S611 correspond to the third connection status III' of FIG. 9 and the step S917 of FIG. 10.

In addition, the switch 43 will judge whether the video cable 46 is connected between the smart display 4 and the external host 41 (step S621). That is, it is equivalent to FIG. 9 of judging whether to switch the smart display 4 from the third connection status III' to the first connection status I' or keep in the third connection status III'.

If the judgment result of the step S621 is negative, the smart display 4 should switch from the third connection status III' to the first connection status I' according to FIG. 9. At this time, the internal host 405 and the peripheral 407 are woken up by the video module 40 (steps S625, S623) and the step S611 is executed again.

On the other hand, if the judgment result of the step S621 is affirmative, it is further judged whether the smart display 4 is connected to the control cable (step S623). This step is equivalent to the step of judging whether the smart display 4 should keep in the third connection status III', or further switch from the third connection status III' to the fourth connection status IV'.

If the judgment result of the step S623 is negative, it represents that the user still only needs to use the display function of the smart display 4. That is, it is judged that the smart display 4 keeps in the third connection status III'. At this time, the flow further returns to the step S619.

If the judgment result of the step S623 is affirmative, it represents that the smart display 4 should further switch from the third connection status III' to the fourth connection status IV'. In other words, this connection status represents that the user, when operating the external host 41, further wishes to use the peripheral 407 of the smart display 4 despite of simply using the display function.

As mentioned hereinabove, in the steps S615 and S617, both the internal host 405 and the peripheral 407 have entered the standby/sleep state. Because the peripheral 407 cannot be rapidly enabled, the external host 41 cannot immediately use the peripheral 407. At this time, the video module 40 firstly displays the prompt message by way of OSD to prompt the user about the condition that the peripheral 407 needs time to switch operation mode (step S629).

In addition, the smart display 4 shuts down the internal host 405 at this time. Therefore, the state of the peripheral 407, recorded by the internal host 405, will not be affected by the external host 41 (step S631).

The reason of shutting down the internal host 405 to execute the peripheral 407 is as follows. When the switch 43 directly enables the peripheral 407 according to the control of the external host 41, the state of the peripheral 407 changes. Incidentally, when the video module 40 subsequently re-enables the internal host 405, the state of the peripheral 407 recorded by the internal host 405 is inconsistent with the actual state of the peripheral 407.

That is, it is possible that the peripheral 407 has been switched from the standby state to the enabled state through the control of the switch 43 according to the requirement of the external host 41, but the internal host 405 incorrectly judges the peripheral 407 as still in the standby state. In such case, the internal host 405 may not normally control the peripheral 407 when the smart display 4 again switches from the passively controlled conventional mode to the actively controlled intelligent mode. Thus, the internal host 405 is shut down in step S631.

Next, after being waken up (step S633), the peripheral 407 is set as being used by the external host 41 (step S635). After the peripheral 407 is set, the prompt message indicating that the state of the peripheral 407 is switching is hidden (step S637). After this step ends, the display function of the smart display 4 and the peripheral 407 are both controlled by the external host 41.

As mentioned hereinabove, the steps S629, S631, S633, S635 and S637 represent that the external host 41 further controls the peripheral 407 in addition to controlling the video module 40 of the smart display 4. Thus, the steps S629, S631, S633, S635 and S637 correspond to the process of switching from the third connection status III' of FIG. 9 to the fourth connection status IV'. Heretofore, the smart display 4 keeps in the fourth connection status IV'. Thereafter, the switch 43 will judge whether the video cable 46 is kept connected (step S639).

If the judgment result of the step S639 is negative, it is equivalent to that the smart display 4 should enter the second connection status II' from the fourth connection status IV'. That is, it is equivalent to the lower dashed line arrow between the second connection status II' and the fourth connection status IV' in FIG. 9. Thus, after the internal host 405 is waken up (step S645) and the peripheral 407 is set as for the internal use (step S647), the step S611 is further executed.

If the judgment result of the step S639 is affirmative, the smart display 4 further judges whether the control cable has been connected (step S641).

When the judgment result of the step S641 is affirmative, the smart display 4 keeps operating in the fourth connection status IV'. Thus, the smart display 4 will execute the operations associated with the fourth connection status IV', such as displaying the image of the external host 41, controlling the peripheral 407 by the external host 41, and the like. In addition, the smart display 4 will again execute the judgment of the step S639.

As mentioned hereinabove, when the judgment result of the step S641 is negative, it represents that the smart display 4 cannot further use the peripheral 407. Thus, the peripheral 407 is set as entering the standby mode (step S643). Thereafter, the video module 40 still keeps displaying the video data of the external host 41 (step S619).

Figure 12A:
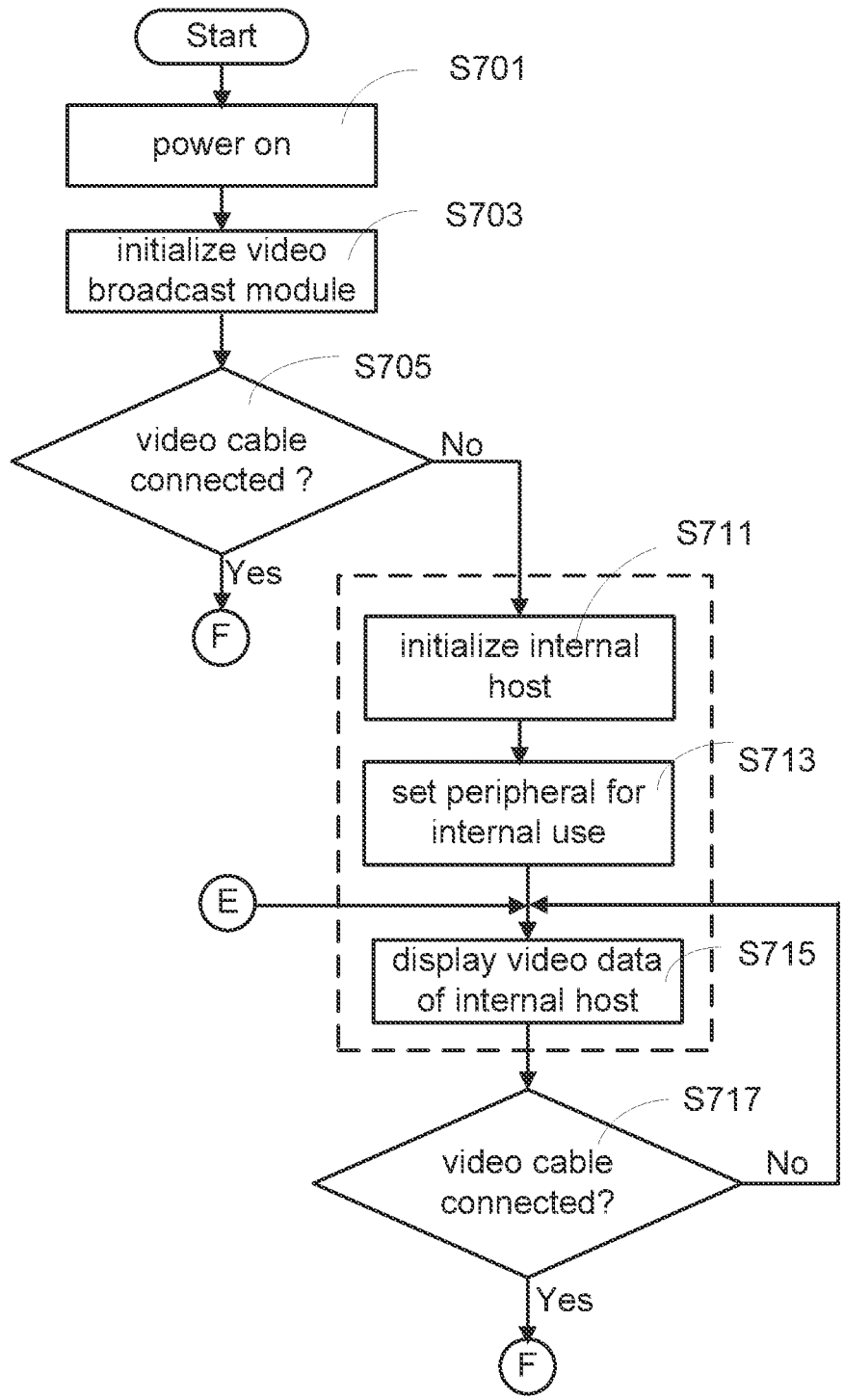
FIGS. 12A and 12B are flow charts showing the smart display of FIG. 8, in which the peripheral is set as for internal-use-only.
Figure 12B:
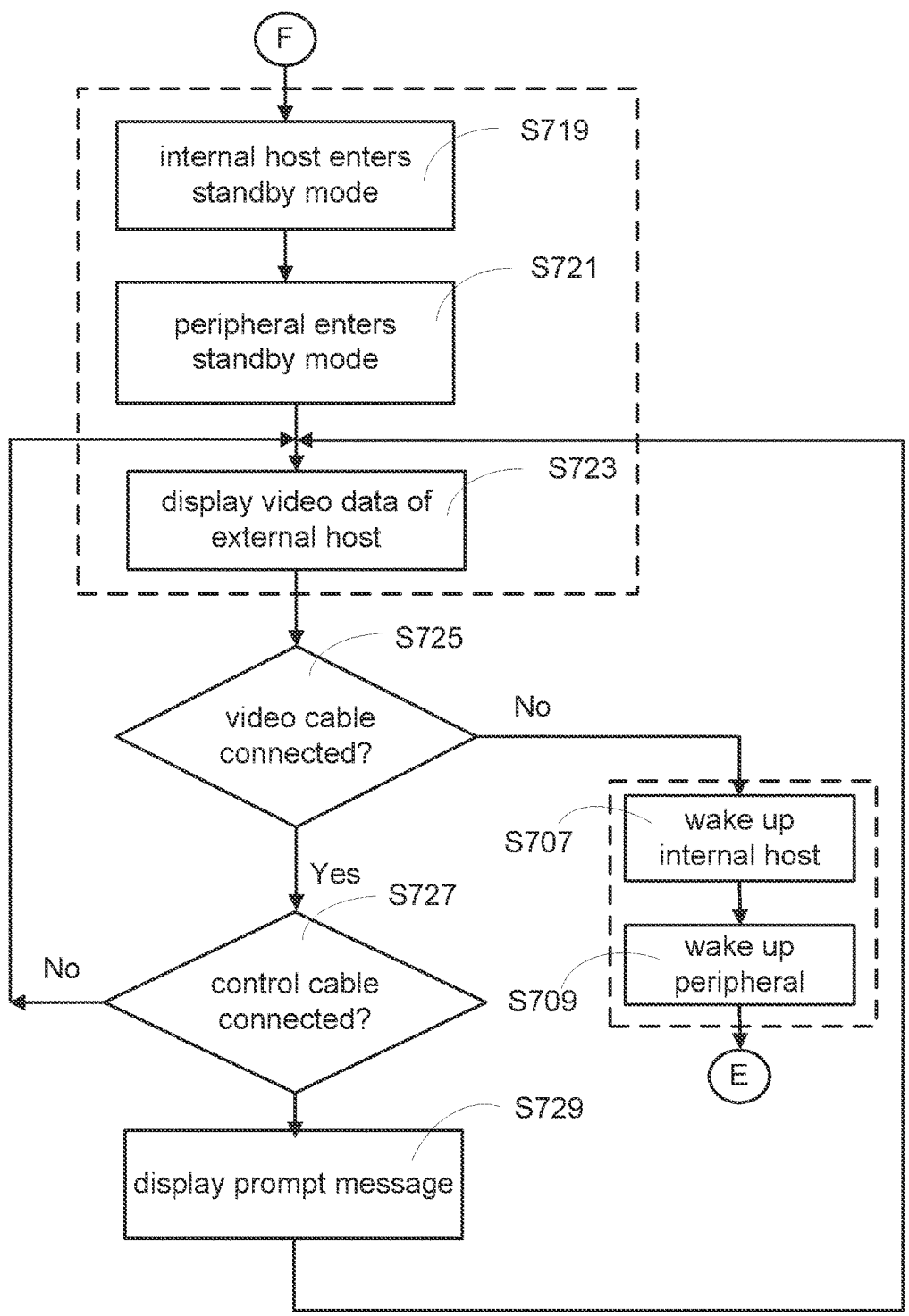

FIGS. 12A and 12B are flow charts showing the smart display 4 of FIG. 8, in which the peripheral 407 is set as for internal-use-only. The flow charts of the drawings can similarly correspond to FIGS. 9 and 10.

First, the smart display 4 is powered on (step S701) and the video module 40 is initialized (step S703). Next, it is judged whether the smart display 4 is connected to the external host 41 through the video cable 46 (step S705).

If the judgment result of the step S705 is affirmative, it represents that the user wishes to use the smart display 4 to display the video data of the external host 41. At this time, steps S719, S721 and S723 are executed.

On the other hand, if the judgment result of the step S705 is negative, it represents that the user wishes to let the smart display 4 enter the actively controlled intelligent mode. Thus, the smart display 4 will initialize the internal host 405 (step S711), and additionally set the peripheral 407 as for the internal use (step S713). Thereafter, the video module 40 will display the video data according to the control of the internal host 405 (step S715). Thereafter, in the process of the video module 40 of displaying the internal video data, the smart display 4 again judges whether the video cable 46 between the smart display 4 and the external host 41 is connected (step S717).

If the judgment result of the step S717 is negative, it represents that the user still wishes to keep the smart display 4 in the actively controlled intelligent mode. Thus, the smart display 4 continuously displays the video data of the internal host 405 (step S715).

If the judgment result of the step S717 is affirmative, it represents that the user changes his/her mind and wishes to control the smart display 4 through the external host 41. At this time, the smart display 4 prepares to switch from the actively controlled intelligent mode to the passively controlled conventional mode. The video module 40 firstly sets the internal host 405 to enter the operation mode with the lower power consumption, such as the sleep mode, the standby mode or the like (step S719). In addition, the switch 43 will also control the peripheral 407 to enter the sleep mode, the standby mode or the like (step S721).

After the internal host 405 and the peripheral 407 enter the sleep mode, the video module 40 starts to display the video data of the external host 41 (step S723). In addition, the switch 43 will judge whether the smart display 4 is connected to the external host 41 through the video cable 46 (step S725).

If the judgment result of the step S725 is affirmative, it is further judged whether the smart display 4 is connected to the external host 41 through the control cable 48 (step S727). If the judgment result of the step S727 is negative, it represents that the user still only needs to use the display function of the smart display 4. At this time, the video data of the external host 41 is kept displayed (step S723).

If the judgment result of the step S725 is negative, it represents that the user wishes to switch to operate the smart display 4 in the actively controlled intelligent mode. Thus, the video module 40 wakes up the internal host 405, which is previously in the standby state (step S707), and wakes up the peripheral 407 (step S709). Next, the video module 40 is again utilized to display the video data of the internal host 405 (step S715).

Furthermore, if the judgment results of the steps S725 and S727 are both affirmative, it represents that the user further wishes to use the peripheral 407 upon the operation of the external host 41, despite of using only the display function of the smart display 4.

However, because the setting parameter represents that the peripheral 407 is set as for internal-use-only, the external host 41 still cannot use the peripheral 407 even if the smart display 4 and the external host 41 have been connected via the control cable 48. At this time, the video module 40 displays the prompt message to inform the user that the current setting parameter does not allow the external host 41 to use the peripheral 407 (step 407 (step S729).

The prompt message in the step S729 may be predefined as being automatically hidden after being displayed for a period of time (e.g., 5 seconds). Alternatively, the prompt message provides a confirmation option of disabling the prompt message after the user selects this option. It is to be noted that, in some applications, the smart display 4 may also provide the setting frame for the setting parameter through a link of the prompt message. The details may be adjusted according to the requirement of the display system, and will not be described herein. After the step S729 ends, the smart display 4 still keeps displaying the video data of the external host 41 (step S723). Thus, if the setting parameter is set as for internal-use-only, the external host 41 is not allowed to use the peripheral 407 when the smart display 4 is in either the third connection status III' or the fourth connection status IV'.

Figure 13:
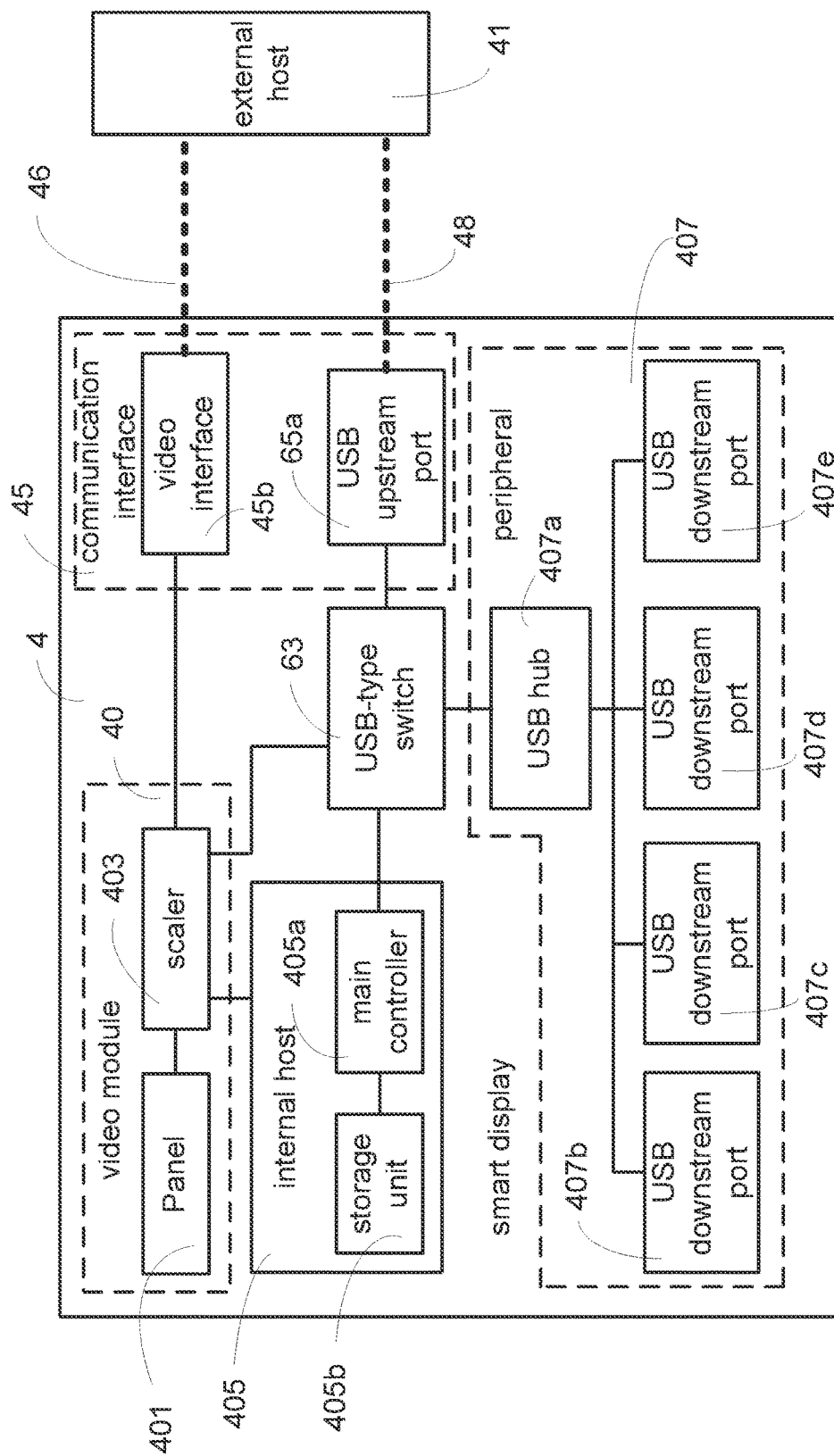
FIG. 13 is a schematic diagram showing the smart display of FIG. 8, which is assumed to have a peripheral including a USB hub and multiple USB downstream ports.

FIG. 13 is a schematic diagram showing the peripheral 407 of FIG. 8, which is assumed to include a USB hub 407a and multiple USB downstream ports 407b, 407c, 407d and 407e.

FIG. 13 further illustrates that the internal host 405 may include a main controller 405a and a storage unit 405b electrically connected to each other. And, the video module 40 may include a scaler 403 and a panel 401 electrically connected to each other. The video data may be transmitted between the scaler 403 and the main controller 405a by way of I/O, UART or the like.

The storage unit 405b may be a volatile or non-volatile memory device. When the internal host 405 controls the video module 40 to display, the storage unit 405b can correspondingly provide the video data to the internal host 405.

In this drawing, it is assumed that the external host 41 is selectively electrically connected to the video interface 45b through the video graphics array (hereinafter referred to as VGA), the high definition multimedia interface (hereinafter referred to as HDMI) or the like; and that the external host 41 is selectively electrically connected to a USB upstream port 65a through the USB cable or the like.

Furthermore, the USB upstream port 65a is electrically connected to a USB-type switch 63. The USB-type switch 63 is electrically connected to the USB hub 407a, and the USB hub 407a is electrically connected to the downstream ports 407b, 407c, 407d and 407e. Thus, when the user connects the USB device to the USB downstream ports 407b, 407c, 407d and 407e, the USB device may be used by the external host 41 or the internal host 405.

If the user operates the smart display 4 in the actively controlled intelligent mode at the beginning and utilizes the video cable 46 to connect the smart display 4 to the external host 41 after a period of time, then the smart display 4 of the invention can rapidly adjust source of the video data, and adjust the state of the peripheral 407 according to different setting parameters.

According to the above-mentioned embodiments, it is obtained that the smart display 4 or 5 of the invention can rapidly provide the most suitable operation mode setting according to the connection status between the smart display 4 or 5 itself and the external host 41, or 51 regardless of whether the video data and the control data share the same cable or not. Such method can satisfy different requirements of the users, and can further dynamically switch the standby and enabled modes of the internal hosts 405, 505 and the peripherals 407, 507 according to different operation modes.

Thus, the user's actual requirements can be satisfied, and the improper control of the peripherals 407, 507 can be avoided.

It is to be noted that each flow chart is used for the purpose of illustrating the smart display 4 or 5 of the invention. Upon the practical application, the flow does not intend to restrict the invention thereto. Furthermore, there may be one or multiple smart displays 4, 5 and different types of peripherals 407/507. In addition, the types of the video interface and the control interface between the smart display 4, 5 and the external host 41, 51 also need not to be restricted.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A smart display used in conjunction with an external host, the smart display comprising:
   a communication interface, selectively electrically connected to the external host;
   an internal host, for adjusting an operation mode according to connection status between the communication interface and the external host;
   a video module, electrically connected to the communication interface and the internal host, for displaying video data provided from and transmitted by one of the external host and the internal host according to the connection status between the communication interface and the external host;
   at least one peripheral; and
   a switch, electrically connected to the internal host, the communication interface and the at least one peripheral, for
   controlling the at least one peripheral according to a setting parameter and the connection status between the communication interface and the external host, wherein
   if the setting parameter corresponds to an internal-use-only setting, the switch controls the at least one peripheral to execute the control data transmitted by the internal host; and
   if the setting parameter corresponds to an automatic detection setting, the switch controls the at least one peripheral to execute the control data transmitted by the internal host when the communication interface is electrically disconnected from the external host, and the switch controls the at least one peripheral to execute the control data transmitted by the external host when the communication interface is electrically connected to the external host.

2. The smart display according to claim 1, wherein:
   one or more processors are configured to execute the internal host and the video module.

3. The smart display according to claim 1, wherein:
   if the communication interface is electrically connected to the external host, the video module displays the video data provided by the external host; and
   if the communication interface is electrically disconnected from the external host, the video module displays the video data provided by the internal host.

4. The smart display according to claim 1, wherein if the setting parameter corresponds to the automatic detection setting, and the connection status between the communication interface and the external host is switched from disconnected to connected, the internal host shuts down; the video module displays the video data provided by the external host; and the switch controls the at least one peripheral to execute the control data transmitted by the external host.

5. The smart display according to claim 1, wherein if the setting parameter corresponds to the internal-use-only setting, and the connection status between the communication interface and the external host is switched from disconnected to connected, the switch controls the at least one peripheral to execute the control data transmitted by the internal host; and the video module displays the video data provided by the external host.

6. The smart display according to claim 1, wherein the communication interface comprises:
   a video interface, selectively electrically connected to the external host through a video cable, for receiving the video data; and
   a control interface, selectively electrically connected to the external host through a control cable, for receiving the control data.

7. The smart display according to claim 6, wherein:
   if the video interface is electrically connected to the external host, the video module displays the video data provided by the external host; and
   if the video interface is electrically disconnected from the external host, the video module displays the video data provided by the internal host.

8. The smart display according to claim 7, wherein:
   if the control interface is electrically connected to the external host, the switch controls the at least one peripheral to selectively execute the control data transmitted by one of the external host and the internal host according to the setting parameter; and
   if the control interface is electrically disconnected from the external host, the switch controls the at least one peripheral to execute the control data transmitted by the internal host.

9. The smart display according to claim 8, wherein if the setting parameter corresponds to the automatic detection setting, the control interface is electrically connected to the external host, and the connection status between the video interface and the external host is switched from disconnected to connected, the internal host shuts down; the video module displays the video data provided by the external host; and the switch controls the at least one peripheral to execute the control data transmitted by the external host.

10. The smart display according to claim 8, wherein if the setting parameter corresponds to the internal-use-only setting, the control interface is electrically connected to the external host, and the connection status between the video interface and the external host is switched from disconnected to connected, the switch controls the at least one peripheral to execute the control data transmitted by the internal host; and the video module displays the video data provided by the external host.

11. A control method, applied between an external host and a smart display comprising a communication interface, an internal host, a video module, at least one peripheral and a switch, the control method comprising the steps of:
   the internal host adjusting an operation mode according to connection status between the communication interface and the external host, wherein the communication interface is selectively electrically connected to the external host;
   the video module displaying video data provided from and transmitted by one of the external host and the internal host according to connection status between the communication interface and the external host; and the switch controlling the at least one peripheral according to a setting parameter and the connection status between the communication interface and the external host wherein if the setting parameter corresponds to an internal-use-only setting, the switch controls the at least one peripheral to execute the control data transmitted by the internal host, and if the setting parameter corresponds to an automatic detection setting, the switch controls the at least one peripheral to execute the control data transmitted by the internal host when the communication interface is electrically disconnected from the external host, and the switch controls the at least one peripheral to execute the control data transmitted by the external host when the communication interface is electrically connected to the external host.

12. The control method according to claim 11, wherein the step of the video module displaying the video data transmitted by one of the external host and the internal host according to the connection status between the communication interface and the external host comprises sub-steps of:
the video module displaying the video data provided by the external host when the communication interface is electrically connected to the external host; and
the video module displaying the video data provided by the internal host when the communication interface is electrically disconnected from the external host.

13. The control method according to claim 11, wherein when the setting parameter corresponds to the automatic detection setting, and the connection status between the communication interface and the external host is switched from disconnected to connected,
the step of the switch controlling the at least one peripheral according to the setting parameter and the connection status between the communication interface and the external host comprises sub-steps of:
shutting down the internal host;
the video module displaying the video data provided by the external host; and
the switch controlling the at least one peripheral to execute the control data transmitted by the external host.

14. The control method according to claim 13, wherein when the setting parameter corresponds to the internal-use-only setting, and the connection status between the communication interface and the external host is switched from disconnected to connected,
the step of the switch controlling the at least one peripheral according to the setting parameter and the connection status between the communication interface and the external host further comprises sub-steps of:
the switch controlling the at least one peripheral to execute the control data transmitted by the internal host; and
the video module displaying the video data provided by the external host.

15. The control method according to claim 11, wherein:
when a video cable is electrically connected in between the communication interface and the external host through, the video module displays the video data provided by the external host; and
when the video cable is electrically disconnected in between the communication interface and the external host, the video module displays the video data provided by the internal host.

16. The control method according to claim 15, wherein:
when the communication interface is electrically connected to the external host through a control cable, the switch controls the at least one peripheral to selectively execute the control data transmitted by one of the external host and the internal host according to the setting parameter; and
when the communication interface is not electrically connected to the external host through the control cable, the switch controls the at least one peripheral to execute the control data transmitted by the internal host.

17. The control method according to claim 16, wherein when the setting parameter corresponds to the automatic detection setting, the control interface is electrically connected to the external host through the control cable, and the connection status between the video interface and the external host through the video cable is switched from disconnected to connected,
the step of the switch controlling the at least one peripheral according to the setting parameter and the connection status between the communication interface and the external host comprises steps of:
shutting down the internal host;
the video module displaying the video data provided by the external host; and
the switch controlling the at least one peripheral to execute the control data transmitted by the external host.

18. The control method according to claim 16, wherein when the setting parameter corresponds to the internal-use-only setting, the control interface is electrically connected to the external host through the control cable, and the connection status between the video interface and the external host through the video cable is switched from disconnected to connected,
the step of the switch controlling the at least one peripheral according to the setting parameter and the connection status between the communication interface and the external host further comprises sub-steps of:
the switch controlling the at least one peripheral to execute the control data transmitted by the internal host; and
the video module displaying the video data provided by the external host.

* * * * *